3,201,189
PROCESS FOR DYEING POLYPROPYLENE FIBERS WITH ACID DYESTUFFS IN THE PRESENCE OF A WATER SOLUBLE THIOCYANATE

Henry R. Mautner, Leonia, N.J., assignor to General Aniline & Film Corporation, New York, N.Y., a corporation of Delaware
No Drawing. Filed Dec. 5, 1963, Ser. No. 328,179
12 Claims. (Cl. 8—55)

This invention relates to coloration of polymeric materials and more particularly to the coloration of certain modified polypropylene polymers.

It is well known in the art that coloration of polypropylene is difficult. The difficulties in coloration of polypropylene have been attributed to (1) its lack of permeability and (2) its lack of dye receptive centers. Most dyes are unable to penetrate the surface of the polymer. Even if a dye is able to penetrate the polymer, there are no dye receptive centers in the polymer with which the dye may react and bind to the polymer. The reasons for both of these difficulties are apparent on consideration of the chemical structure of polypropylene which is shown in Formula 1. Polypropylene is a paraffinic hydrocarbon which lacks the reactive groups that are normally present in other types of polymers and act as dye receptive centers.

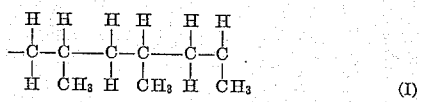

(I)

For instance in nylon, dye receptive centers are present in the form of amide and amine groups and in cellulose, dye receptive centers are present as hydroxyl groups. When reactive groups such as amide, amine or hydroxyl groups are present in the polymer, it is possible to obtain colors with fastness properties necessary for useable dyeings by using well known reaction mechanisms such as salt formation and hydrogen bonding to bind the dye to the polymeric material. Although polypropylene may be colored with oil soluble dyes and deep colors are produced, the color fastness of polypropylene articles dyed with oil soluble dyes is poor because reaction between the dye and polymer does not occur.

A number in ingenious techniques have been used to obtain dyeability of polypropylene articles. These techniques include (1) use of additives such as chemicals, polymers or metallic compounds; (2) fiber modification such as chemical reaction on the fiber; (3) graft copolymers such as dyeable polymers grafted on to the fiber polymer chain and (4) miscellaneous methods such as the use of fiber swelling agents or the like. These various techniques are described in the article entitled, "New Color for Polypropylene," which appeared in Chemical Week, vol. 92, No. 15, of April 13, 1963, on pp. 33–36. Although these techniques have resulted in improved coloration of polypropylene, they still leave much to be desired.

It is an object of this invention to provide an improved process for the coloration of shaped articles of certain modified polypropylene polymers. Another object of this invention is to provide a dyeing process which will result in the improved coloration when used with polypropylene polymers modified by the various techniques described above other than by the use of metallic compounds as additives. Other objects and advantages of my invention will appear as this description proceeds.

The attainment of the above objects of this invention is made possible by my discovery of a process which comprises treating a shaped article of modified polymerized propylene in the presence of a water soluble thiocyanate in an acidic aqueous medium containing an acid dye. The process embodied by this invention provides an improved method for coloration of modified polypropylene articles. This invention provides a greater variety of shades than were previously available. It also provides improved color yields and color fastness properties.

By modified polypropylene shaped articles I mean polypropylene structures in the form of fibers, filaments, yarns, slubbings, warps, fabrics, bristles, films, tubing, molded articles or the like. These articles may be fabricated from either supported or unsupported polypropylene. Since these polypropylene articles may be prepared by a variety of techniques, it is to be understood that the particular technique employed to render polypropylene dyeable will determine the number of dye receptive centers present in the polymer.

It is also to be understood that other modifying agents such as plasticizers or the like may be present in the polypropylene shaped article. A number of shaped articles may also be used in combination to form yarns or ropes and dyed by the process disclosed in my invention. It is also possible to use combinations of polypropylene shaped articles in conjunction with shaped articles of other polymeric materials. For example, polypropylene fibers or yarn may be present in a mixed fabric with other heterofibers such as cotton, wool, rayon, nylon, polyesters or the like.

The term "acid dye" as used in this invention pertains to those dyes which are normally used to dye wool and silk from an acid bath. Acid dyes generally contain either a carboxylic or sulfonic acid group in their molecule. Such acid dyes include water soluble dyes from the following classes: azo, triarylmethanes, xanthene, anthraquinone, nitro, pyrazolone, thiazole, azine, thiazine or the like.

These various types of acid dyestuffs are well known and are readily available to the trade. Commercially available acid dyes include Acid Black 1 (CI 20470), Acid Orange 7 (CI 15510), Acid Red 14 (CI 14720), Acid Violet 56 (CI 16055), Acid Red 186 (CI 18810), Acid Blue 158 (CI 14880) or the like wherein the names and numbers used to designate these dyes are those as given and used in the Colour Index (The Society of Dyers and Colourists and The American Association of Textile Chemists and Colorists 2nd ed. 1956).

Examples of thiocyanate salts which may be employed in this invention include the water soluble thiocyanates. Sodium thiocyanate or ammonium thiocyanate are preferred because they are readily available, have excellent solubility properties, are relatively inexpensive and have other desirable properties. Other water soluble thiocyanates may also be used including thiocyanic acid and water soluble alkali metal, alkaline earth metal and metal thiocyanates such as potassium, magnesium, calcium, barium, zinc, aluminum, tin, cadmium, lithium, guanidine, mono-(lower alkyl)-substituted guanidines, symmetrical and unsymmetrical di-(lower alkyl)-substituted guanidines wherein the lower alkyls may be methyl, ethyl or the like.

In general, the acid dyestuffs are applied to the polypropylene shaped article in amounts up to about 10% with the preferred amounts being from 0.01 to 10% of the dyestuff based on the weight of the polypropylene article. The water soluble thiocyanate is preferably employed in proportions from about 5 to 20% by weight based on the polypropylene article and is expressed as (o.w.f.) which means on the weight of the fiber or article. Although amounts as low as 1% (o.w.f.) or less of the thiocyanate may be employed, the degree of improvement in coloring properties of the dye is of course smaller. The amount of acid present in the dye bath may vary from above 0.1 to 10% (o.w.f.) with the preferred amount being from 3 to 9% (o.w.f.). Any common commercial acid such as sulfuric, acetic or the like may be used.

The usual methods normally employed in dyeing articles such as textile fibers or the like with acid dyestuffs may be used in the practice of this invention. These methods involve placing the prescoured article in dye bath liquor at room temperature up to temperatures in the range of about 100 to 170° F. The bath is then heated to at least 180° F. and preferably up to boiling temperatures and maintained at such temperatures until the dye bath is substantially exhausted and/or the desired shade is obtained. Although superatmospheric pressures and temperatures above 212° F. may be used and are operative, these conditions are usually not necessary in the present invention.

The water soluble thiocyanate salt may be dissolved in the dye bath prior to when the polypropylene articles are entered, but usually I prefer to add the thiocyanate to the dye bath after the bath has been heated to 195° F. and run at this temperature for at least 45 minutes. Following completion of the dyeing process, the article is rinsed with water and washed with detergent preferably at elevated temperatures of about 140 to 180° F.

The coloration of polypropylene shaped articles may be carried out in such a manner that an overall or local effect is obtained. If desired, the dyestuff may be applied by a printing process in which case the dye medium may be thickened in a known manner by the addition of thickening agents such as starch, gum tragacanth, gum arabic or the like. It will also be understood that the process disclosed by this invention may be carried out in conjunction with any of the known dyeing procedures and with the addition of any dyeing assistants, textile auxiliaries, softening agents, wetting agents or the like that are normally used in dyeing with acid dyes.

A preferred method for carrying out the process disclosed by this invention involves the following steps:

Step 1—Prescour: A sample of the polypropylene article to be dyed is placed in a prescour bath containing 1% (o.w.f.) soda ash and 1% (o.w.f.) synthetic detergent, such as a water soluble nonionic surfactant for 20 minutes at 180° F. After scouring, the bath is dropped and the fiber rinsed.

Step 2—Dyeing: A dye bath containing for instance 6% (o.w.f.) acid dye, 5.0% (o.w.f.) sulfuric acid monohydrate and 1.0% (o.w.f.) of a nonionic surfactant is prepared and the polypropylene article is entered into the bath. The dye bath is heated to 195° F. over a 30-minute period, run for 45 minutes at 195° F. and 10.0% (o.w.f.) sodium thiocyanate added. The bath is then heated to the boil and boiled for 35 minutes. At the end of this period, the fiber is removed from the bath, rinsed and soaped. Polypropylene fibers dyed by the process disclosed in this invention were evaluated by the AATCC Standard Test Methods for color fastness to light, crocking and washing.

The following examples illustrate the process disclosed by my invention. These examples are to be regarded only as illustrative of the present invention and are not to be considered as limitative. It will be understood that all parts, proportions and percentages referred to herein and in the appended claims are by weight unless otherwise indicated.

Example 1

A sample of dyeable polypropylene fiber was dyed by using the following modification of the procedure given in the article entitled, "New Piece Dyeable Polypropylene Carpet Fiber," G. R. Cuthbertson et al., which appeared in Modern Textiles, v. 44, No. 9, pp. 89–96, for September 1963. Briefly, the dyeing procedure involved the following steps.

A piece of dyeable polypropylene carpet fiber (U.S. Rubber Co.) was prescoured in a bath containing 1% (o.w.f.) soda ash and 1% (o.w.f.) synthetic detergent for 20 minutes at 180° F. The bath was dropped and the fiber rinsed until clear. The fiber was then placed in a set dye bath cool containing 0.5% of synthetic detergent and from 3 to 5% acetic acid. A mixture of acid black dye representing 6.0% (o.w.f.) and containing 83 parts Acid Black 1 (CI 20470), 14 parts Acid Orange 7 (CI 15510) and 3 parts Acid Red 14 (CI 14720) was added to the dye bath. The temperature of the bath was then raised to 175° over 30 minutes and the goods were run at this temperature for 30 to 45 minutes. After dyeing, the bath was dropped and the fiber rinsed. The dyed fiber was afterscoured in a bath containing 1% (o.w.f.) synthetic detergent at 160° F. for 10 minutes. The bath was then dropped and the fiber rinsed.

The black produced by this procedure was not quite full enough and showed a considerable loss in depth in a Wash No. 2 test (Color Fastness to Washing—Standard Test Method 35–1961–AATCC). Similar results were obtained in drycleaning tests. A Fade-Ometer test (Color Fastness to Light: Carbon Arc Lamp—Standard Test Method 16A–1963–AATCC) showed a noticeable break at 5 hours and a considerable break at 10 hours.

Example 2

Another sample of dyeable polypropylene fiber was dyed with the same acid dye mixture and at the same dye concentration as in Example 1 by using the following procedure. The fiber was scoured by the prescour procedure described in Example 1. The goods were entered in a set dye bath cool containing 5.0% (o.w.f.) sulfuric acid monohydrate and 1.0% (o.w.f.) of a water soluble nonionic surfactant. The acid black mixture was then added to the bath and the bath temperature raised to 195° over 30 minutes. The dyeing was run for 45 minutes at 195° and 10.0% (o.w.f.) of sodium thiocyanate was added. The bath was then raised to its boiling point and boiled for 35 minutes. The goods were then rinsed and soaped.

Examination of the fiber showed that a full black was produced. Wash No. 2 tests gave fair results. The drycleaning test gave very good results. Fade-Ometer Tests of 10 hours and 20 hours showed only a very slight break. Crocking tests with fibers dyed by the procedures described in Examples 1 and 2 both gave values of (2–3) further demonstrating the advantages of the full black produced in Example 2. The crocking tests were made according to the Color Fastness to Crocking (Rubbing) Standard Test Method 8–1961–AATCC. In this test the degree of crocking or staining of effect fibers has been classified in the following manner: Class (1) heavy stained, Class (2) considerabel stained, Class (3) noticeable stained, Class (4) slightly stained and Class (5) negligible or not stained.

Example 3

A sample of dyeable polypropylene carpet fiber was dyed with 3.0% (o.w.f.) of an acid navy blue mixture containing 34 parts of Acid Violet 56 (CI 16055), 10 parts Acid Red 186 (CI 18810) and 56 parts Acid Blue 158 (CI 14880) by the procedure described in Example 1. A light blue shade having very good Wash No. 2 and drycleaning properties was obtained. Fade-Ometer exposure at 5 hours showed a noticeable break and at 10 hours a considerable break. A wet crocking test gave a value of (3–4) and a dry crocking test (3).

Example 4

A sample of dyeable polypropylene fiber was prescoured by the procedure described in Example 1. The fiber was then placed in a 140° F. bath containing 2.0% of the textile auxiliary described in Example 2 and 3% of the acid navy blue dye described in Example 3. Ammonium thiocyanate, 20% was then added. The bath was heated to its boiling point and boiled for one hour. Sufficient sulfuric acid to give 5.0% (o.w.f.) was added to the bath and the bath was boiled for 30 minutes. Additional sulfuric acid, 3.0% (o.w.f.) was then added and the bath was boiled for 30 minutes. The bath was then dropped and the goods rinsed.

A deep blue shade was obtained by this procedure. Both Wash No. 2 and drycleaning tests were very good. No break at 20 hours was observed in the Fade-Ometer test. Both crocking wet and dry tests gave values of (4–5).

This invention has been disclosed with respect to certain preferred embodiments. Various modifications and variations thereof will become obvious to persons skilled in the art. It is to be understood that such modifications and variations are to be included within the scope of the present invention.

What is claimed is:

1. A process for dyeing a polypropylene fiber comprising treating the fiber with an acidic aqueous medium consisting essentially of an aqueous solution of an acid dye and a water soluble thiocyanate.
2. A process as defined in claim 1 wherein the acidic aqueous medium contains from 1 to 20% by weight of water soluble thiocyanate.
3. A process as defined in claim 1 wherein the water soluble thiocyanate is sodium thiocyanate.
4. A process as defined in claim 1 wherein the water soluble thiocyanate is ammonium thiocyanate.
5. A process as defined in claim 1 wherein the acidic aqueous medium contains from 1 to 15% by weight of an acid.
6. A process as defined in claim 1 wherein the aqueous acidic medium contains sulfuric acid.
7. A process as defined in claim 1 wherein the aqueous acidic medium contains acetic acid.
8. A process for coloring a polypropylene fiber which comprises treating the fiber with an acidic aqueous medium consisting essentially of an aqueous solution of an acid azo dye and a water soluble thiocyanate.
9. A process as defined in claim 8 wherein the water soluble thiocyanate is sodium thiocyanate.
10. A process as defined in claim 8 wherein the said water soluble thiocyanate is ammonium thiocyanate.
11. A process as defined in claim 8 wherein the acidic medium contains sulfuric acid.
12. A process as defined in claim 8 wherein the acidic medium contains acetic acid.

References Cited by the Examiner

Chemical Week, vol. 92, No. 15, Apr. 13, 1963, pp. 33–36.

Guthbertson et al., Modern Textiles, vol. 44, No. 9, pp. 89–96, September 1963.

NORMAN G. TORCHIN, *Primary Examiner.*

UNITED STATES PATENT OFFICE
CERTIFICATE OF CORRECTION

Patent No. 3,201,189                                                             August 17, 1965

Henry R. Mautner

It is hereby certified that error appears in the above numbered patent requiring correction and that the said Letters Patent should read as corrected below.

Column 1, line 46, for "in" read -- of --; column 2, line 70, for "10%" read -- 15% --.

Signed and sealed this 19th day of April 1966.

(SEAL)
Attest:

ERNEST W. SWIDER                                                  EDWARD J. BRENNER
Attesting Officer                                                      Commissioner of Patents